Sept. 19, 1967     S. J. PRZYBYLKO     3,342,196
VORTEX ANALOG SPEED SENSOR
Filed Jan. 4, 1966     3 Sheets-Sheet 1
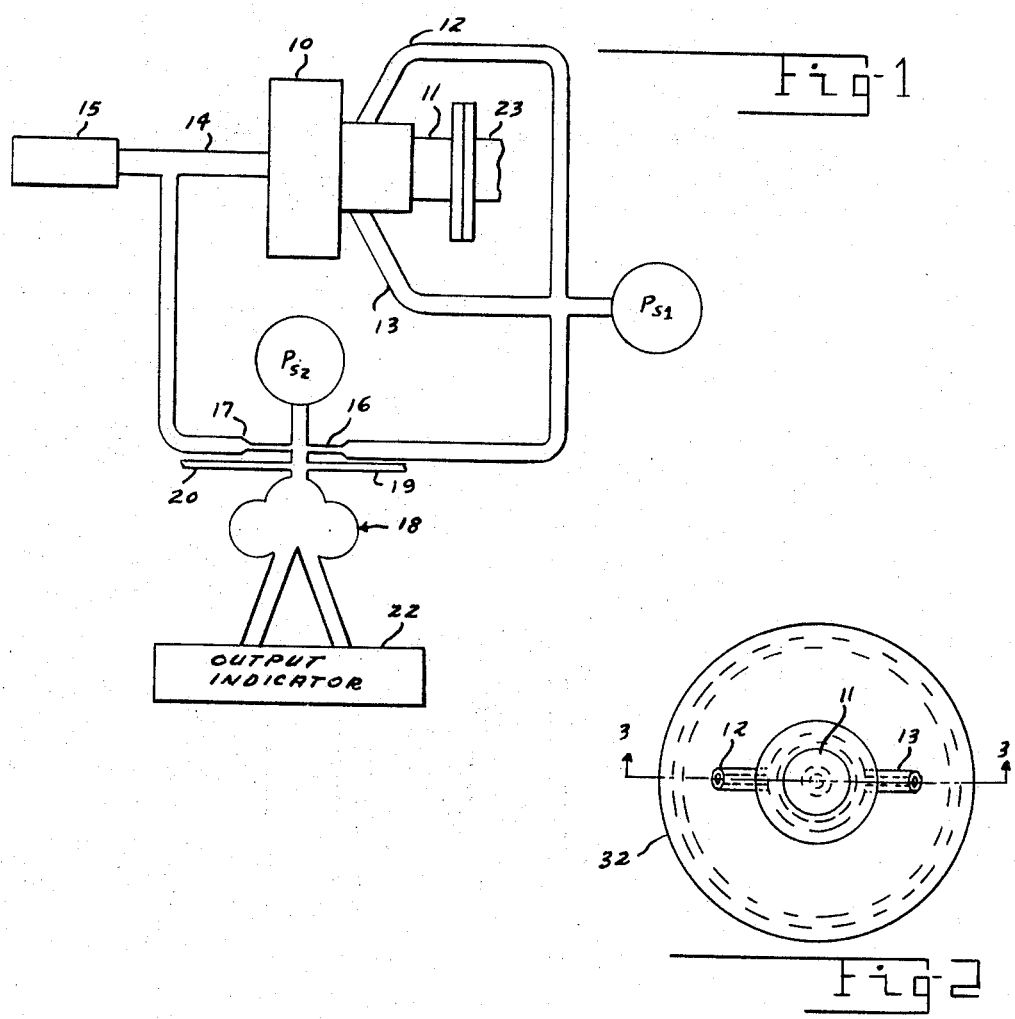
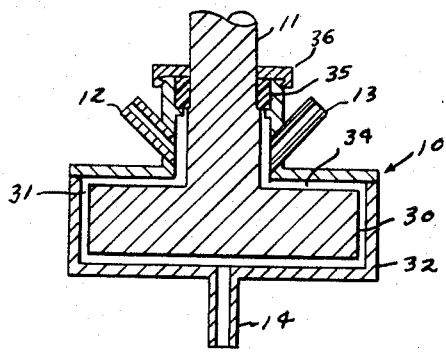
INVENTOR.
STEPHEN J. PRZYBYLKO
BY Harry A. Herbert Jr
ATTORNEY
Richard J. Killoren
AGENT Sept. 19, 1967     S. J. PRZYBYLKO     3,342,196

VORTEX ANALOG SPEED SENSOR

Filed Jan. 4, 1966     3 Sheets-Sheet 2

INVENTOR.
STEPHEN J. PRZYBYLKO
BY Harry A. Herbert Jr.
ATTORNEY
Richard J. Killoren
AGENT

# United States Patent Office 3,342,196
Patented Sept. 19, 1967

3,342,196
VORTEX ANALOG SPEED SENSOR
Stephen J. Przybylko, South River, N.J., assignor to the United States of America as represented by the Secretary of the Air Force
Filed Jan. 4, 1966, Ser. No. 518,739
6 Claims. (Cl. 137—36)

The invention described herein may be manufactured and used by or for the United States Government for governmental purposes without payment to me of any royalty thereon.

This invention relates to a speed sensing device for producing a fluid signal proportional to the angular velocity of a rotating shaft.

One object of the invention is to provide a device, for sensing the angular velocity of a rotating shaft, which is compatible with other pure fluid systems.

Another object of the invention is to provide a device, for sensing the angular velocity of a rotating shaft, which will have greater durability and reliability than prior art devices.

These and other objects will be more fully understood from the following detailed description taken with the drawing, wherein:

FIG. 1 is a schematic fluid circuit partially in block form for the speed sensor of the invention;

FIG. 2 is an end view of the speed sensing unit for the speed sensor of FIG. 1;

FIG. 3 is a sectional view of the device of FIG. 2 along the line 3—3;

Pure fluid systems have certain advantages over other systems in that they can provide reliable operation in certain adverse environments. Currently programs are conducted to develop new control systems for engines and aircraft. Various sensors are needed to convert various parameters into fluid signals. According to this invention, a device is provided to produce a fluid signal which is proportional to the angular velocity of a shaft to which it is attached. The fluid signal produced is adapted for use with standard pure fluid control systems.

Figure 4:
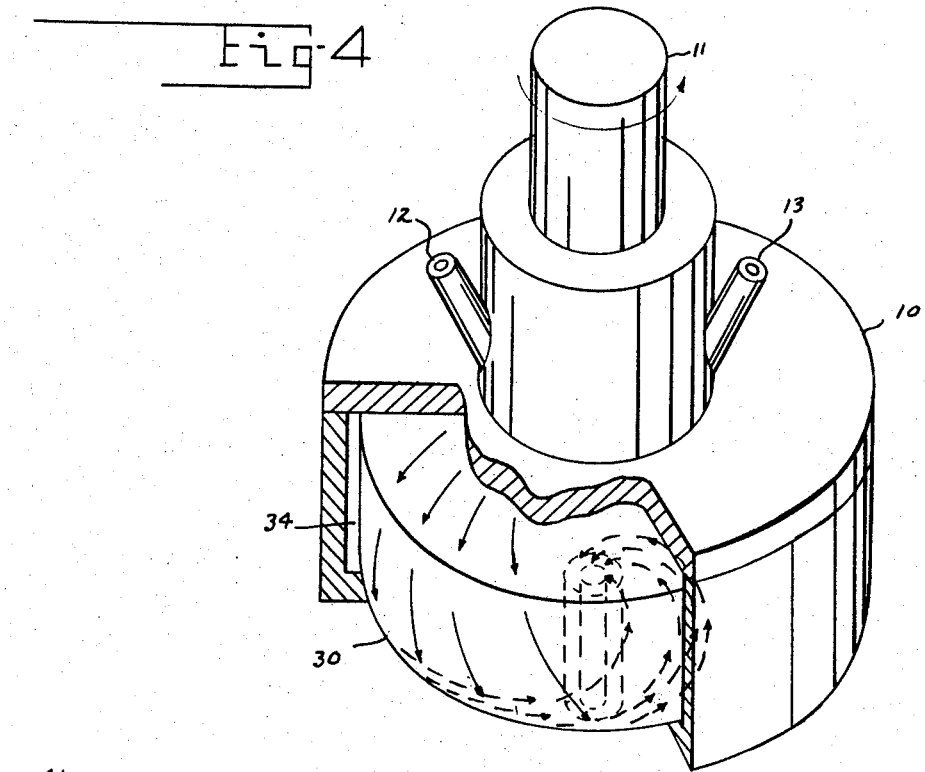
FIG. 4 is a partially cutaway enlarged isometric view of the device of FIG. 2.

Reference is now made to FIG. 1 of the drawing which shows a vortex speed sensor 10 having an input shaft 11 which will be described in greater detail with respect to FIGS. 2-4. A fluent material such as air under pressure is supplied to a pair of input tubes 12 and 13 from a supply $P_{s1}$. The output tube 14 feeds into a flow restrictor 15, which may, for example, be a plurality of capillary tubes in a pipe secured to the tube 14. The differential input and output pressures of the vortex speed sensor 10 are supplied to the inputs 16 and 17 of a proportional summing amplifier 18. A control signal may be supplied to inputs 19 and 20 when the device is to be used for speed control. A fluent material such as air is supplied to the proportional summing amplifier 18 from a supply $P_{s2}$. The output of amplifier 18 is fed to a utilization device such as a speed indicator 22. The utilization device could be a device to control the speed of shaft 23, if desired.

As shown in FIG. 3, the vortex speed sensor 10 has a rotating cylindrical element 30 having a larger diameter than shaft 11. The end of shaft 11 and the cylindrical element 30 are located within a chamber 31 in a housing 32. The output tube 14 is provided in the housing wall on the side of element 30 remote from shaft 11. Tube 14 is concentric with shaft 11. An air space 34 is provided around cylindrical element 30 and shaft 11. The input tubes 12 and 13 feed the fluent material into the space 34. An annular seal 35 is provided between shaft 11 and housing 32. A seal retainer 36 is attached to housing 32.

In the operation of the device of the invention, a fluent material such as air under pressure is supplied to input tubes 12 and 13, passed through the space 34 around the cylindrical element 30 and out the tube 14. If the cylindrical element 30 is rotating it will impart a tangential component of velocity to the fluent material as it passes around the element 30. This will cause the air to follow a logarithmic spiral toward the output 14, which will cause a vortex to exist in the output. The greater the vorticity in the output 14, the greater will be its resistance to flow. Thus, as the angular velocity of the cylindrical element 30 increases, the pressure drop across the vortex speed sensor will increase as shown by the curve in FIG. 6. The input and output pressures are supplied to a conventional proportional summing amplifier 18. The output of the amplifier may be supplied to a speed indicator 22 such as a bellows controlled indicator or may be used to control the speed of the shaft as shown in FIG. 5.

Figure 5:
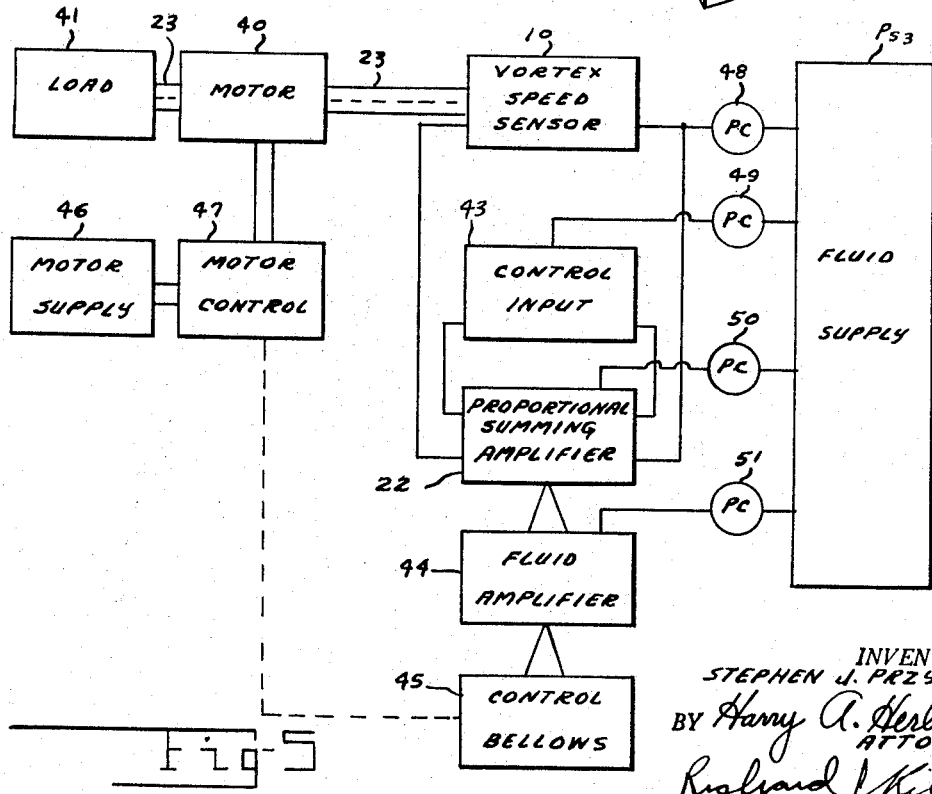
FIG. 5 is a schematic block diagram, showing a system in which the device of the invention might be used; and, FIG. 6 is a curve showing the pressure difference as a function of shaft r.p.m. for the device of FIG. 1.
Figure 6:
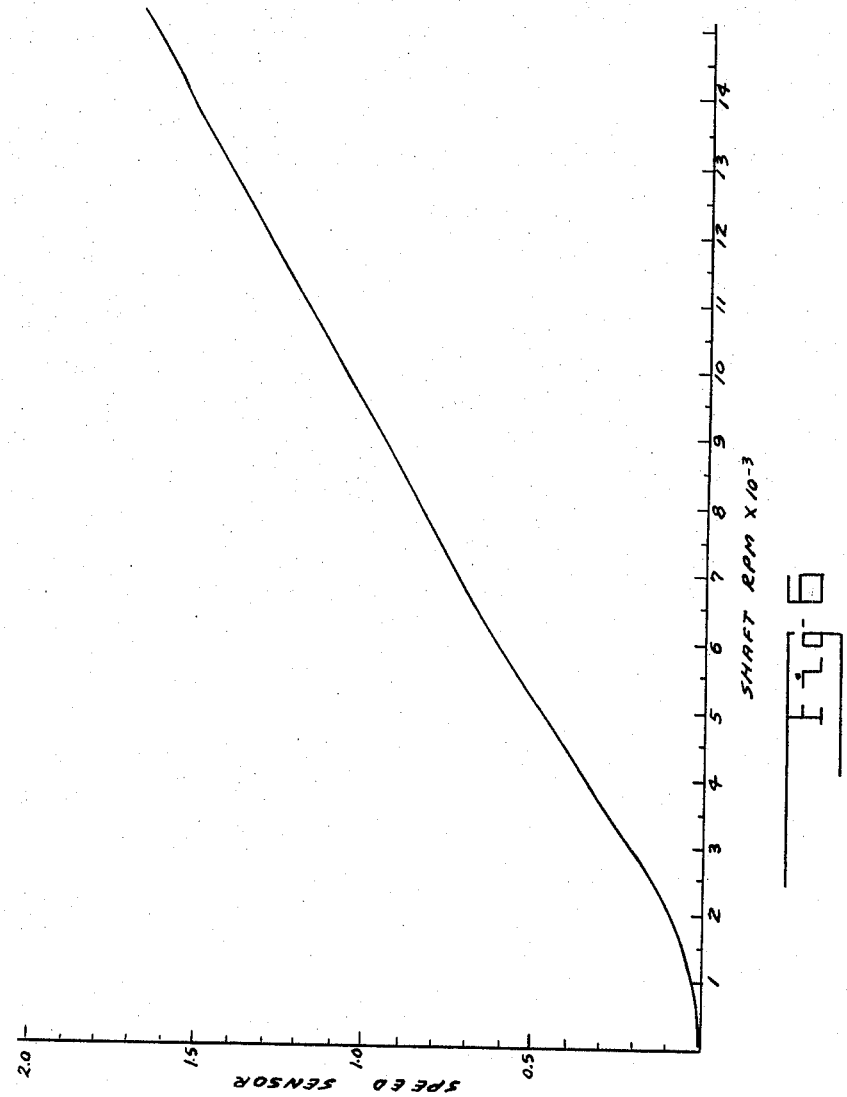

The device of FIG. 5 shows the shaft 23 driven by a motor 40 which also supplies power to the load 41. The input and output air pressures of vortex speed sensor 10 are supplied to the proportional summing amplifier 18. A control signal from the control input 43, such as from the throttle control linear fluid potentiometer is also supplied to the summing amplifier 18. The output of the summing amplifier is amplified in fluid amplifier 44, the output of which controls the input to motor 40 from motor supply 46 by means of bellows 45 and motor control valve 47. The motor control 47 would be a fuel control device when a jet engine or internal combustion engine is used and would be a potentiometer or other electrical control device when an electric motor is used. Though FIG. 1 shows separate fluent material supplies $P_{s1}$ and $P_{s2}$, it is to be understood that the control fluid for the vortex generator and proportional summing amplifier could be supplied from one supply $P_{s3}$ with separate pressure control devices such as 48, 49, 50, and 51 where needed.

There is thus provided a speed sensing device for producing a fluid signal proportional to the angular velocity of a rotating shaft.

While certain specific embodiments have been described, it is obvious that numerous changes may be made without departing from the general principle and scope of the invention.

I claim:

1. A device for providing a fluid signal proportional to the angular velocity of a rotating shaft, comprising: a rotatable cylindrical element, having a diameter larger than said shaft, means for connecting said rotatable element to said shaft; a housing surrounding said cylindrical element; said housing being spaced from said cylindrical element by a predetermined distance, to thereby provide a fluent material passage around said cylindrical element, within said housing; means for supplying a fluent material to said passage in said housing; a cylindrical output tube, in said housing, with a diameter substantially less than the diameter of said cylindrical element; said output tube being coaxial with said cylindrical element and located on the side of said cylindrical element remote from said shaft and means, connected to the input and output of said housing, and responsive to the flow therethrough, for providing a differential pressure signal proportional to the angular velocity of said shaft.

2. The device as recited in claim 1 including means, connected to said output tube, for restricting the air flow through said housing.

3. The device recited in claim 2 including a proportional summing amplifier; means for applying said input and output to said proportional summing amplifier; means for applying a control signal to said summing amplifier; means responsive to the output of said proportional summing amplifier for controlling the angular velocity of said rotating shaft.

4. The device as recited in claim 2 including means connected to the input and output of said housing, for indicating the differential pressure between said input and output, to thereby indicate the angular velocity of said shaft.

5. The device as recited in claim 3 wherein said fluent material is air.

6. The device as recited in claim 4 wherein said fluent material is air.

References Cited

UNITED STATES PATENTS

| | | | |
|---|---|---|---|
| 2,450,199 | 9/1948 | Leibing | 137—36 X |
| 2,454,565 | 11/1948 | Peterson | 137—36 |
| 2,642,275 | 6/1953 | Sollinger | 137—36 |
| 3,256,899 | 6/1966 | Dexter | 137—81.5 |
| 3,290,947 | 12/1966 | Reilly | 137—13 |

CLARENCE R. GORDON, *Primary Examiner.*